(12) United States Patent
Thompson

(10) Patent No.: US 7,444,948 B1
(45) Date of Patent: Nov. 4, 2008

(54) MECHANIZED PLANTER

(75) Inventor: Dale Thompson, Evergreen, AL (US)

(73) Assignee: Shoreline Restoration Services, LLC, Brewton, AL (US)

( * ) Notice: Subject to any disclaimer, the term of this patent is extended or adjusted under 35 U.S.C. 154(b) by 0 days.

(21) Appl. No.: 11/852,550

(22) Filed: Sep. 10, 2007

Related U.S. Application Data (60) Provisional application No. 60/940,185, filed on May 25, 2007.

(51) Int. Cl.
*A01C 11/00* (2006.01)
*A01C 15/00* (2006.01)

(52) U.S. Cl. ............ 111/109; 111/200; 111/900; 111/903; 111/906

(58) Field of Classification Search ......... 111/100–102, 111/104, 105, 109, 52, 149, 152–156, 170, 111/174, 200, 900, 903, 906, 915, 919
See application file for complete search history.

(56) References Cited

U.S. PATENT DOCUMENTS 3,104,632 A * 9/1963 Crump ............ 111/200

* cited by examiner

*Primary Examiner*—Christopher J. Novosad
(74) *Attorney, Agent, or Firm*—Russsell Carter Gache; Maynard Cooper & Gale, PC (57) ABSTRACT

A planter for the mechanized planting of sea oats in beach or other difficult planting areas. The planter includes a calibrator that automates the release of sea oat plants through various release tubes as the planter moves over a chosen planting area. The calibrator controls the release of each plant at re-selected distances. Growth agent is introduced through ancillary mechanisms either through the release tubes or just behind each tube. A plow in front of each release tube creates a furrow into which each plant is deposited, and a series of grates are strategically positioned to control the reflow of planting soil back into each furrow after release and to then smooth any remaining soil adjacent the filled in furrow. The planter is towed behind a tractor through nominal hitches, and a chair and planting support rack is provided for an operator positioned in the center of the planter.

23 Claims, 12 Drawing Sheets

MECHANIZED PLANTER

This application claims the benefit of filing priority under 35 U.S.C. §119 and 37 C.F.R. §1.78 of the U.S. Provisional Application Ser. No. 60/940,185 filed May 25, 2007, for a MECHANIZED PLANTER. All information disclosed in that prior application is incorporated herein by reference.

FIELD OF THE INVENTION

The present invention relates to planters. Particularly, the invention relates to mechanized planters. More particularly, the invention relates to mechanized planters for use on soft earth such as sand.

BACKGROUND OF THE INVENTION

Various types of planters are used to plant new growth bulbs. Some planters may be handheld or performed by hand, some planters may be pulled behind animals or tractors, and some planters may be self propelled. All of the planters generally perform the same tasks: making a hole, placing a bulb in the hole, and filling the hole. The planters may also add growth agent to the hole prior to filling the hole. Based upon the geography of the planting region, different types of planters may be used.

Beaches provide a unique planting region. The ground, covered in sand, may be generally soft and easily plowable. However, additional limitations, such as weight, may be limited due to environmental concerns and performance. Consequently, most planting on beaches is performed by hand, where individuals walk the beach, dig holes, and place bulbs directly into the sand with a growth agent. As individual bulbs are placed in the sand, a planter then refills the holes with the sand removed from the hole. The process may be long and painstaking.

Sea oats may be used to protect the dunes on the beaches from further erosion. Real estate development and storms have destroyed large populations of sea oats, which serve as a beach barrier between the beach and beachside commerce and buildings such as hotels, stores and beach homes. In particular, increased damage due to weather damage, particularly hurricanes, has increased the need for planting. Weather damage, more than destroying the sea oats, also erodes the dunes, thus new planting is needed to rebuild to levels prior to weather damage. Generally, the planting includes teams of individuals, spacing out individual plants a certain distance from other sea oats. In order to increase the rate of planting in order to keep up with replacing and rebuilding dunes frequently damaged by weather, the number of teams and the number of planters on teams have been increased.

SUMMARY OF THE INVENTION

An object of the invention provides a planter comprising a plow, a plurality of tubes and a grate. The plow is configured to dig a furrow into the ground, and each of the plurality of tubes is configured to deliver a plant into the furrow. A system of grates is configured to siphon ground cover into the furrow.

DESCRIPTION OF THE PREFERRED EMBODIMENTS

Figure 1:
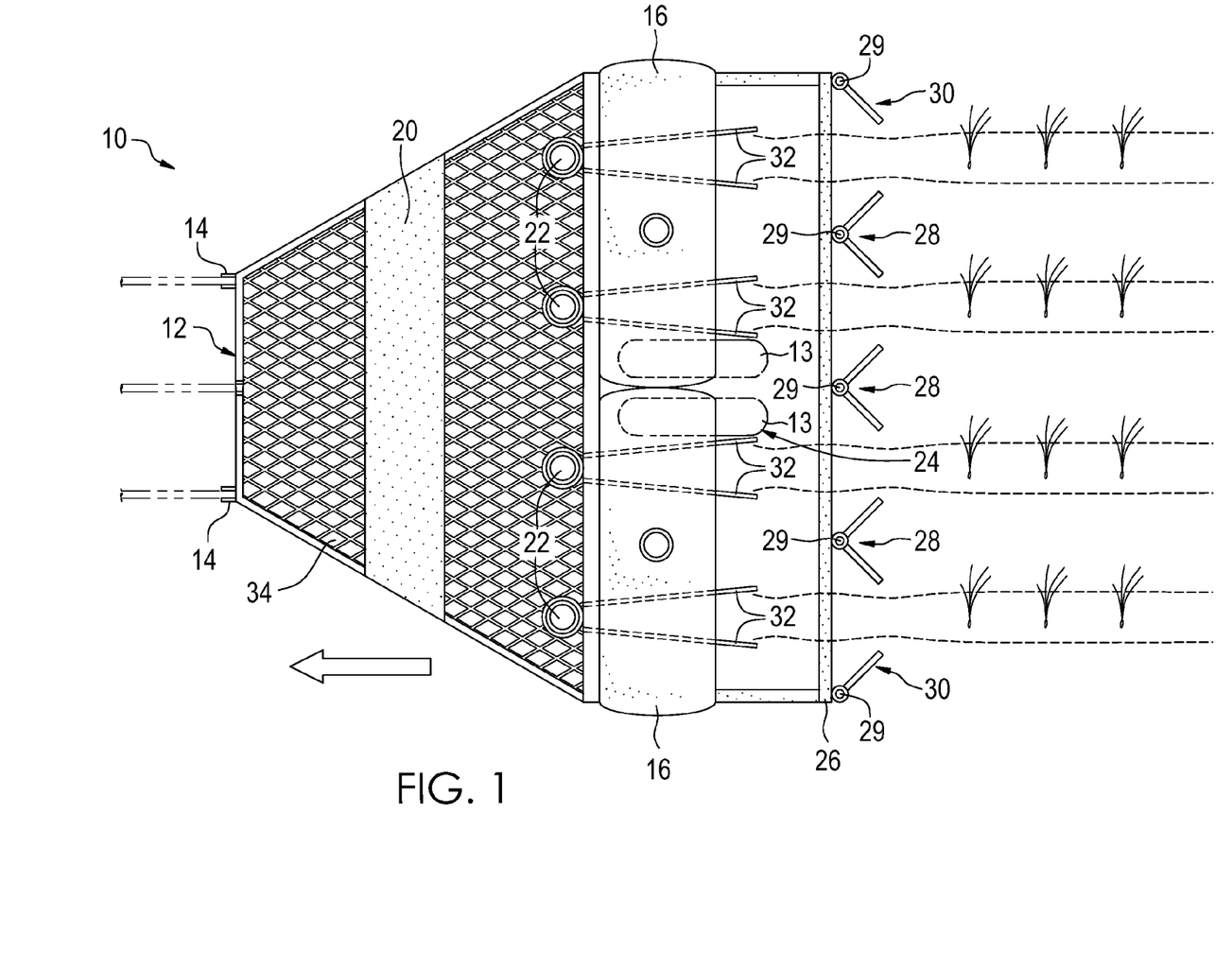
FIG. 1 is a plan view of a the preferred embodiment of the sea oats planter.

Turning now to the drawing figures, FIG. 1 is a top plan view of a sea oats planter 10. The sea oats planter 10 includes a support frame 12, a tow hitch 14, and two growth agent containers 16. The support frame 12 also supports oats trays 18, a seat 20, and delivery tubes 22. The rear of the support frame 12 supports, trailing leveling arm support 26, leveling grates 28 and 30, and filling grates 32. A grated platform 34 provides the floor of the support frame 12.

The support frame 12 is attached to a tow hitch 14 at the front of the support frame 12. The tow hitch 14 may be configured to attach to a tractor, automotive vehicle, animal or other propulsion system, and my comprise a three-point support hitch so that some of the weight of the planer 10 is supported by a single hitch configuration to the extent that weight of the planter 10 is not distributed onto rear wheels 13. While the hitch 14 is located at the same height as the frame 12, the hitch 14 may be located at a height sufficient to attach to the propulsion system as is known. Moreover, while the hitch 14 in this embodiment is a hitch for a ball joint, any connection may be used to hitch the planter 10 to a propulsion system.

The support frame 12 is configured to stabilize the planter 10 and includes the platform 34 which supports the operator portion of the planter 10. The operator sits on the bench seat 20 and faces toward the rear of the planter 10 so that the operator may place the sea oats into the delivery tubes 22. The sea oats are typically stored on trays in tray support platforms 18 that are positioned conveniently to the operator, such as on left or right ancillary positioned wire mesh support platforms (see FIG. 6) or on inclined supports (see FIG. 3) until the operator places the sea oats into the delivery tubes 22. While two workable configurations are shown herein, the support platforms 18 may be placed in any configuration so that the operator may easily access and place the oats into the tubes 22.

As the planter 10 travels forward, the operator loads oats into the tubes 22 and after the oats have been dropped into the ground (as described below), the operator reloads the tubes 22 with oats. Growth agent from the growth agent container 16 mixes in the delivery tubes 22 with the oats prior to the oats being dropped into the ground. This mixing enables the oats to be planted with growth agent in the hole where the oat is planted.

Figure 3:
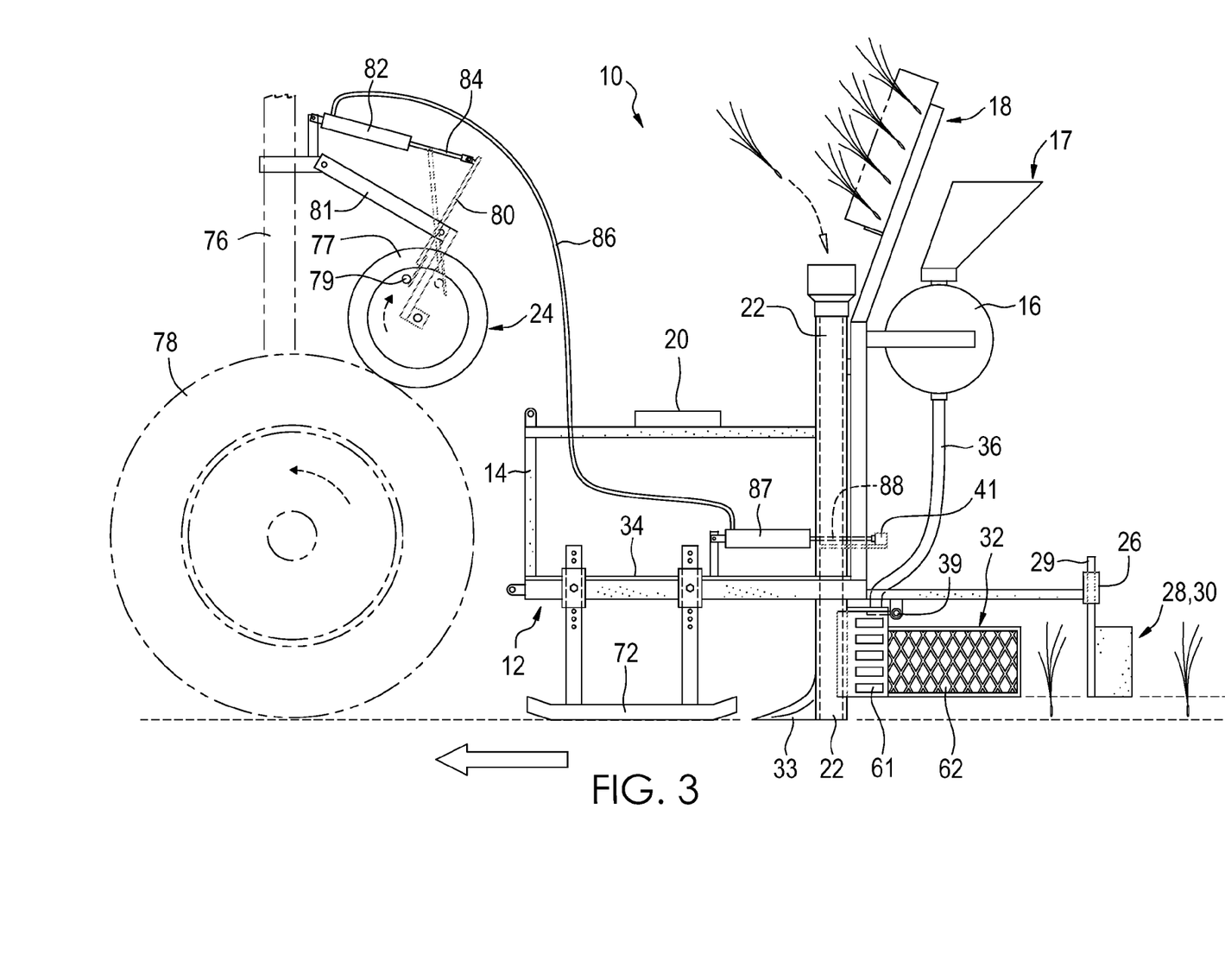
FIG. 3 is a side view of the preferred embodiment of the sea oats planter of FIG. 1.

In the rear of the planter 10, filling grates 32 siphon sand into the furrow created by a plow 33 located under the growth agent container 16 (shown in FIG. 3). As the planter 10 is pulled forward, the furrow extends from under the planter 10. The filling grates 32 allow sand to fill into the furrow to set the sea oats in the sand in a "feathering" fashion. As described below with reference to FIG. 12, the feather filling of the filling grates 32 stops sand from immediately rushing into the furrow which may knock the sea oats under the sand. Leveling grates 28 and 30 are located on the leveling arm 26 behind the filling grates 32 and are utilized to push any remaining sand that has not fallen back into the furrow behind the filling grates 32 into the furrow to level the sand behind the planter 10. The leveling grates 28 and 30 are spaced such that sand which may pile up between adjacent filling grates 32 will be leveled back into the furrow. The outer leveling grates 30 include a single vane for pushing sand inward, while the inside leveling grates 28 include a pair of vanes configured to push sand from the ridges into adjacent furrows. As may be understood, a single vane for each furrow might be utilized to level sand, or the filling grates might be omitted altogether depending upon the type of soil into which the oats are planted.

The vanes of the leveling grates 28 and 30 and the filling grates 32 may also be oriented at an angle relative to the direction of travel of the planter 10. At low degrees of angle, the grates 28, 30, and 32 move less sand, and at higher degrees of angle, the grates 28, 30, and 32 move more sand. As would be expected, at higher degrees of angle, the grates 28, 30, and 32 increase the drag of the planter 10, and in sand that is very soft and allows for deep penetration of the planter 10 into the ground, the angles of the vanes may be set at small degrees relative to the direction of travel because the sand is more likely to fill in based on the fluidity of the sand.

A distance calibrator 24 determines how far the planter 10 has moved and determines the frequency of planting of each individual sea oat. Measuring the distance allows the planter 10 to automatically release the oats into the ground so that the placement of the oats is not dependent on the time it takes the operator to place the oats in the tubes 22, but maintains a regulated planting distance. Generally, it may be beneficial to place the oats about 18 inches apart in the furrows. This spaces the oats out a distance that is beneficial for proper growth and efficient in stopping erosion. Similarly, the distance between adjacent tubes 22 on the planter 10 is also spaced about 18 inches apart for the same purpose, but may be adjusted via clamps 23 to any desirable width.

While the preferred embodiment shown in FIGS. 1-5 includes four tubes 22, the number of tubes 22 may be varied, and may be a function of the width of the planter 10 and the working area for the operator. In addition, the upper ends of the tubes 22 may be oriented around the operator instead of in a straight line with the lower portion of the tubes 22 positioned behind the plow so that the sea oats drop into the furrows.

Figure 2:
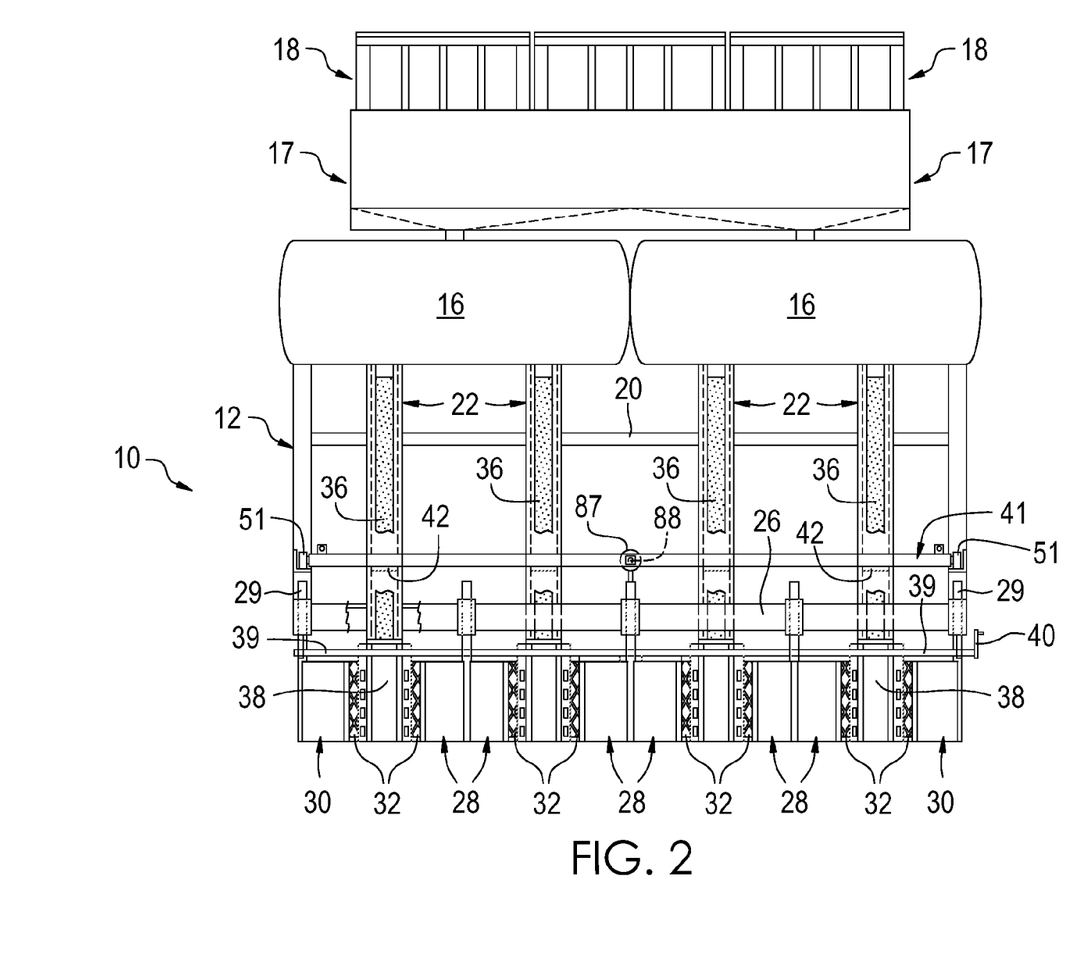
FIG. 2 is a perspective rear view in partial section of the preferred embodiment of the sea oats planter of FIG. 1.

FIG. 2 shows a sectional rear perspective view of the preferred embodiment of the sea oats planter of FIG. 1. The trailing leveling arm support 26 and the leveling grates 28 and 30 have been removed from the planter 10. Bench seat 20 and tray supports 18 are positioned to allow visibility to the rear, and the open view of the planter 10 allows for an operator to view the ground behind the planter 10. The tubes 22 extend vertically from the operator's level to the ground, but may be conveniently positioned by moving clamps 23 (see FIG. 5).

The platform 34, which supports the bench seat 20, also supports the growth agent container 16 and tray supports 18 through the support frame 12. Therefore, as shown, the growth agent containers 16 are supported above the delivery tubes 22 so that gravity may supply the growth agent to the tubes. In addition, the tray supports 18 are supported above and just in front of the growth agent hopper 17 so that the operator is positioned ergonomically to obtain and load the oats into the tubes 22.

Upon the delivery of each oat down delivery tubes 22, growth agent containers 16 dispense growth agent gelatin through hoses 36 adjacent to each planted oat. The hoses 36 extend from the grown agent container 16 to a deliver release slot or cutouts 38 so that upon actuation of a release bar, growth agent may be released into the furrow adjacent to the deposited oat. The growth agent release bar 39 includes a pivoting flap (not shown) covering the bottom of the each hose 36. An arm 40 rotates in response to the compression of a cable 70 thereby rotating bar 39 and opening the flap to delivery growth agent.

Similarly, release bar 41 includes a tongue 42 configured to slide laterally in and out of the tubes 22 in response to the distance calibrator 24, as will further discussed. The distance calibrator 24 actuates the release bar 41 after the planter 10 has traveled a particular distance, thus pulling the tongues 42 of the release bar 41 out of the tubes 22 and dropping the oats down to the ground through cutouts 38. The growth agent release via the bottom of tube 36 is timed to coincide with the drop of the oat.

After the oats have dropped, cutouts 38 in the tubes 22 release the oats upright in the ground. The cutouts 38 are formed by removing a portion of the tube 22, as shown such that the oats to leave the cutouts 38 in upright fashion. The oats are generally around 8-12 inches tall, so the cutout 38 should be sized to generally allow for the oats to exit the tubes 22 without bending.

Filling grates 32 siphon sand into the furrow, and may be formed from a material that has holes such as expanded metal. Expanded metal is suitable because it allows sand to slowly fall back into the furrow through the holes. As the planter 10 moves forward, the ground dug up in front of the tubes 22 with the small plow member 33 may fall through the holes in the grates 32 and around the ends of the grates 32. Thus, as the planter 10 moves forward, the relief between the created furrow and the adjoining ridge is gradually smoothed. The gradual decrease in depth helps maintain the planted oat upright in the ground by reducing the force of the displayed ground returning into the furrow. The speed at which the furrows fills, and the change in grade from the cutouts 38 is determined by the speed of the planter 10, the size of the filling holes, the angle of the grates 32 relative to the direction of travel, the length of the grates 32, and other factors. Depending on the type of ground where the planter 10 is used, these characteristics of the filling grates 32 will by necessity be changed. The grates 32 may be formed from other materials, which may have suitable holes, slots or other shapes formed in them.

Turning now to FIG. 3, the presented side view of the sea oats planter of FIG. 1 shows more clearly the items already discussed; namely, seat 20, a frame 12, a platform 34, a hitch 14, trays supports 18, delivery tubes 22, and growth agent hopper 17, and growth agent container 16. Additionally, the planter 10 includes growth agent hoses 36, a release bar 41, a distance calibrator 24, and filling grates 32. Plows 33, located in front of the tubes 22, digs a furrow in the ground, and leveling grates 28,30 attached to the support frame 12 by a leveling grate arm 26, are adjustable in height and angle through the leveling grate posts 29.

In operation, as the planter 10 of FIG. 3 progresses, the plows 33 dig a furrow into the ground. The seedling to be planted are placed into the tubes 22 by an operator located on the seat 20. The seedling is dropped into the ground when the distance calibrator 24 actuates the release bar 41, and grates 32 and 28,30 fill and level the ground behind the planter 10.

The plows 33 are located on the front of each tube 22, but follow a leveling plate or skid pad. Skid 72 serves to level the ground just before a furrow is created by plow 33, and also is useful to remove larger debris in the path of the planned furrow so that the delivery tube and following grates do not become fouled with debris. Each plow 33 digs a small furrow in front of their respective tubes 22. Thus, in between adjacent plows, the ground is raised into ridges. The filling and leveling grates 32 and 28,30 level the ground between the furrows dug by the plows and the ridges between the plows. While the method of digging the holes for the sea oats may be a plow in one embodiment, additional embodiments may include methods of digging individual holes using other means, such as hydraulic or other mechanical means.

When the planter 10 is attached to a propulsion system, the hitch 14 provides the link between the planter 10 and the propulsion system. In operation, the weight of the planter 10 is primarily supported on the plows 33, but the hitch 14, as well as the grates 32 and 28,30, and the rear wheels 13 also support portions of the weight. When most of the weight is supported on the plows 33, the plows 33 have more force to dig the furrows. By locating the growth agent containers 16 and the mechanisms of the planter close to the plows 33, most of the weight may be directed to the plows 33. In addition, the weight of the operator may also be situated relatively close to or directly over the plows 33. Positioning these weighty elements near the plows also helps to maximize the downward force on the plows 33 while minimizing torque on the plows 33 generated by the weight of the planter 10 itself. Obviously, in cases in which hitch 14 is a three point configuration, the operator of the tractor can also vary the downward pressure by adjusting the lifting angle of the hitch 14.

Figure 4:
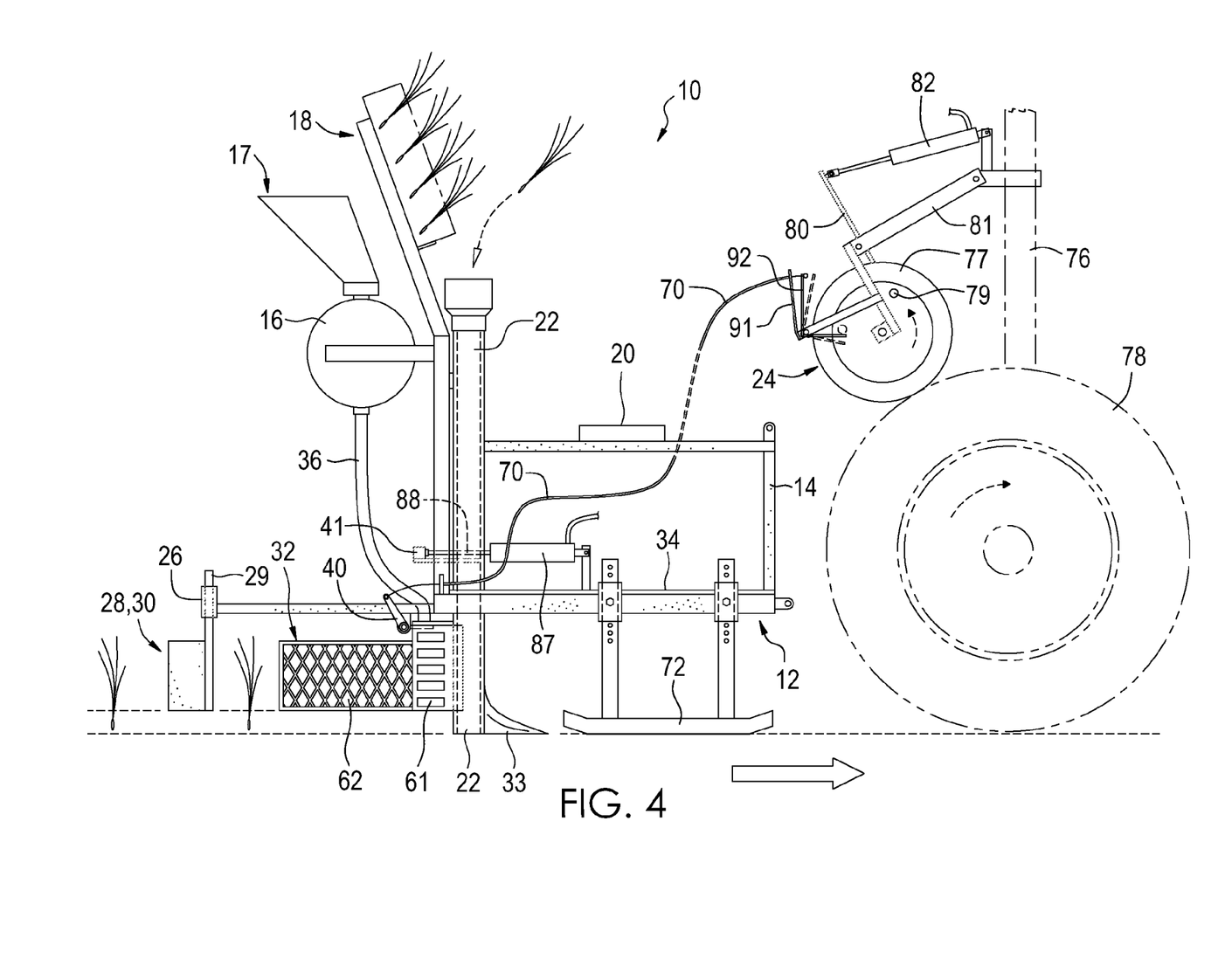
FIG. 4 is the other side view of the preferred embodiment of the sea oats planter of FIG. 1.

FIGS. 3 and 4 show more clearly the operation and interaction of the calibrator 24 and its ancillary elements to deliver sea oats into the ground along with growth agent. As shown in FIG. 3, calibrator 24 is supported by tractor roll bar or other support frame having sufficient height to position calibration tire 77 upon tractor rear tire 78. Steel peg or post 79 is welded onto the rim of tire 77 and during rotation contacts actuation arm 80 connected to hydraulic cylinder 82. As the peg 79 advances, peg 79 contacts a resilient member at the bottom of arm 80 and raises arm 80 up until pin 79 transits below the resilient member. Upon contact with the arm 80, arm 80 raises up and forces lower piston rod 84 into cylinder 82. Hydraulic fluid is thereby forced into hydraulic line 86 connected to a hydraulic cylinder 87, inversely corresponding to the position of cylinder 82. The two cylinders 80,87 are configured to move in reverse synchronization with one another so that as cylinder 82 is compressed, arm 88 on cylinder 87 is extended in identical reverse manner as to arm 84. Arm 88, in turn, is connected to release bar 41 and pushes bar 41 toward the rear of the planter 10 in response to actuation of cylinder 87 (see FIG. 10). Therefore, release bar 41 is actuated as peg 79 rotates around the center of wheel 77, moving it back and forth and releasing sea oats in tube 22 when the release bar's tongue inside the tube 22 is retracted. A biasing spring 52 is also connected to the release bar 41 from frame 12 to bias bar 41 toward the front of the planter 10 and to assist in resetting cylinder 82 into an uncompressed state so that the cycle may repeat. As may be understood, a single peg 79 on wheel 77 creates a planting period equal to one rotation (i.e. the circumference) distance of the wheel 77. By adding additional pegs to wheel 77, the period of planting may decreased. Alternatively, a larger wheel 77 might be utilized to increase the planting period. Disengagement of the calibrator 24 occurs by raising support arm 81 so that wheel 77 no longer contacts tractor wheel 78. Lowering wheel 77 such that it engages wheel 78 begins the planting process.

Now referring to FIG. 4, which shows the same view as FIG. 3, but from the opposite side of planter 10, it may be seen that calibrator 24 also controls the release of growth agent adjacent to each planted sea oat. Support bracket 91 connected to bracket 81 supports a pivoting "L" shaped member 92. The upper portion of 92 is connected to a cable 70 and the lower portion of 92 extends towards wheel 77 into the path of peg 77. As peg 79 transits across and contacts the lower portion of 92, 92 pivots and pulls the cable wire within 70 toward the front of the planter 10. This movement causes a corresponding movement of rotating arm 40 such that bar or rod 39 rotates clockwise, and pivots the flaps biased against the bottoms of delivery hoses 36 downward to open hoses 36 and release growth agent. A spring (not shown), is connected to either the arm 40 or the pivot member 92, or both, to basis the flaps against the bottom of the delivery hose 36, thereby retaining the growth agent in the tube until the next sea oat release.

Figure 5:
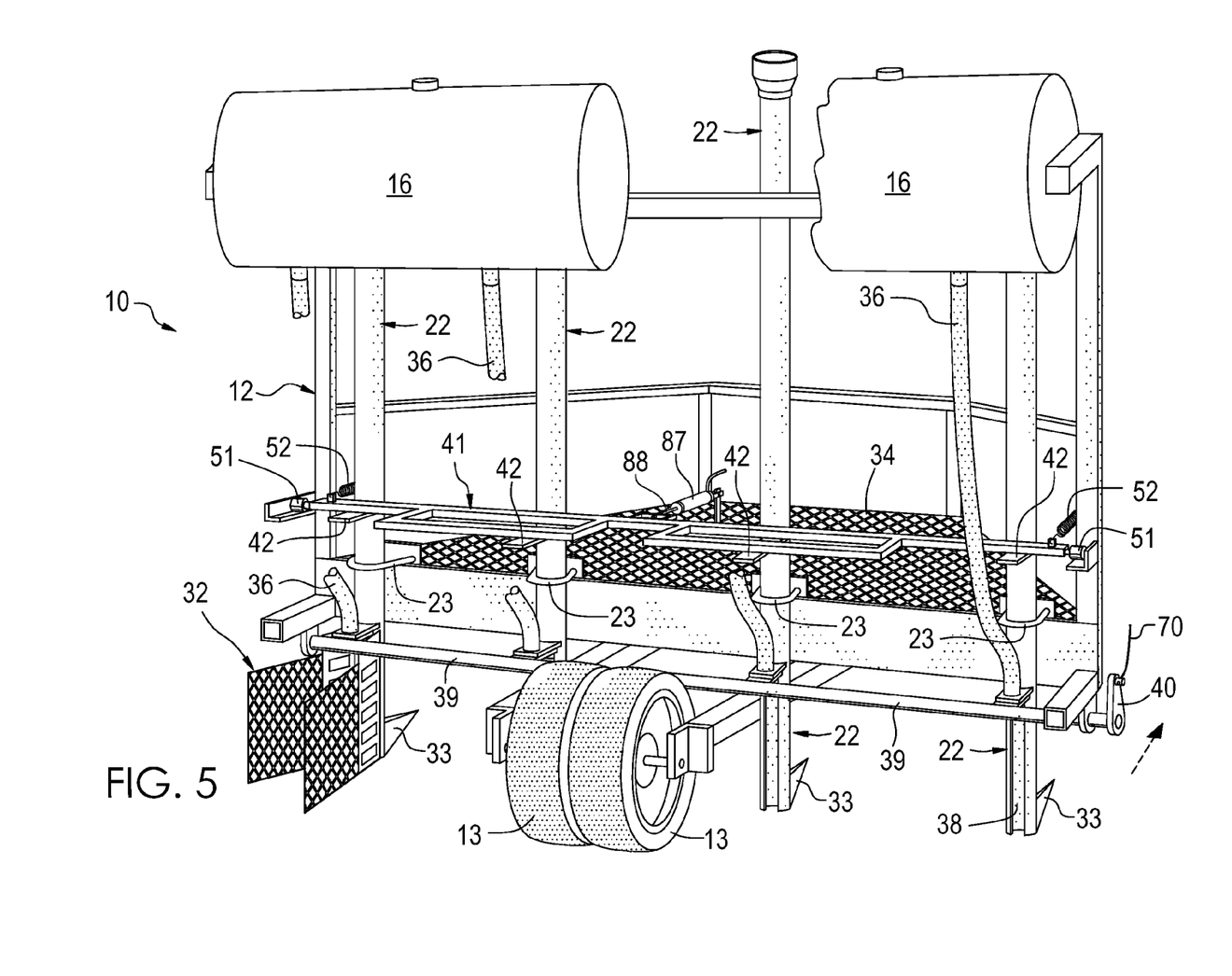
FIG. 5 is a perspective partial section, rear view of a part of the preferred embodiment of the sea oats planter of FIG. 1.

As shown in isolation in FIG. 5, during planting, the lower tires 13 rest on the ground supporting the planter 10 along with the other supporting elements such as the plow 33, tow hitch 14, and leveling gates 32. The calibrator 24 actuates the release bar 41 to drop sea oats down tube 22 as discussed. The release bar 41 returns to its original position when the off-axis peg 79 continue to rotate and drop below the lowest portion of the vertical posts 48. The bias members 52 (a spring on each side) pull the release bar 41 forward to re-insert the tongues 42 into the tubes pending another rotation of the calibrator wheel 77. Circular guides 51 ride on angled guides that act as retaining rails and support the weight of the release bar as it moves forward and backward to drop the seedlings.

Figure 6:
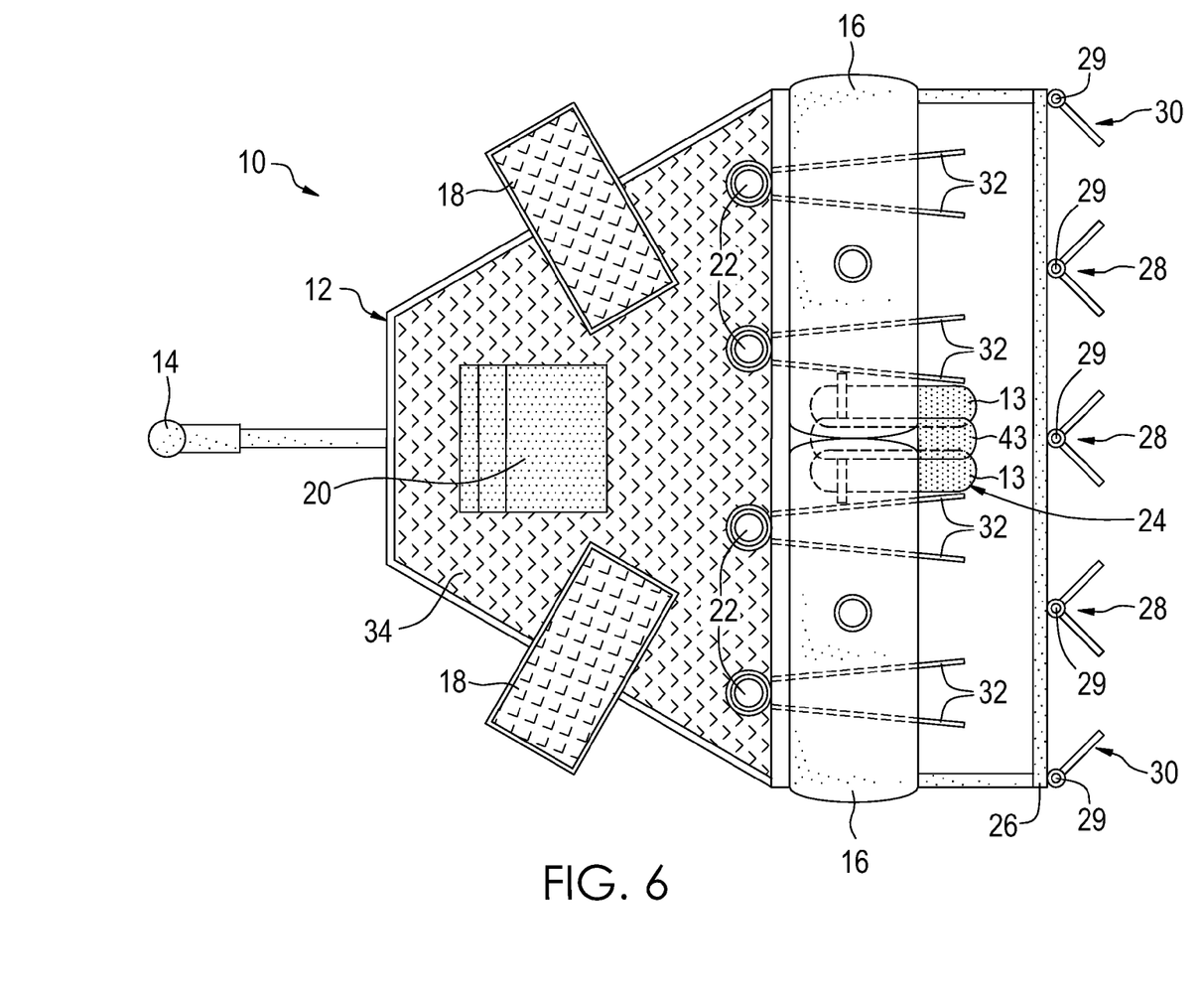
FIG. 6 is a plan view of a second embodiment of the sea oats planter.
Figure 7:
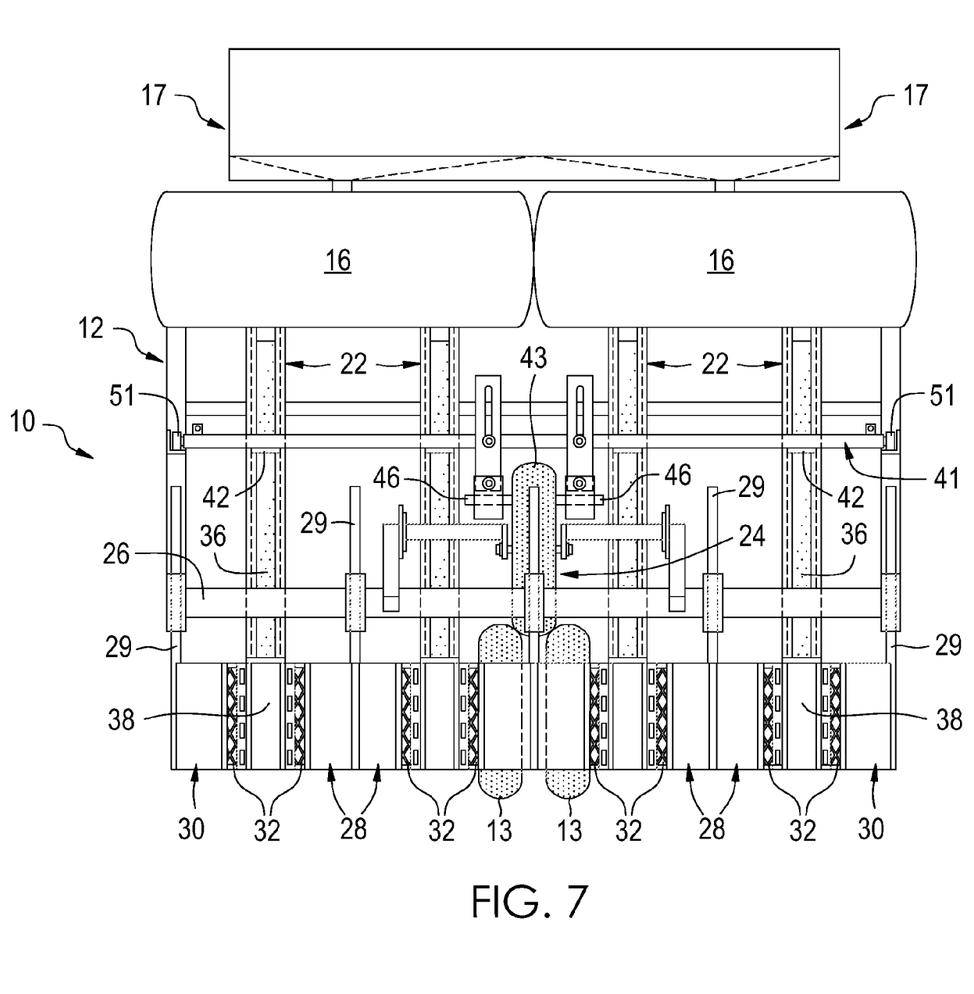
FIG. 7 is a rear view in partial section of the second embodiment of the sea oats planter of FIG. 6.
Figure 8:
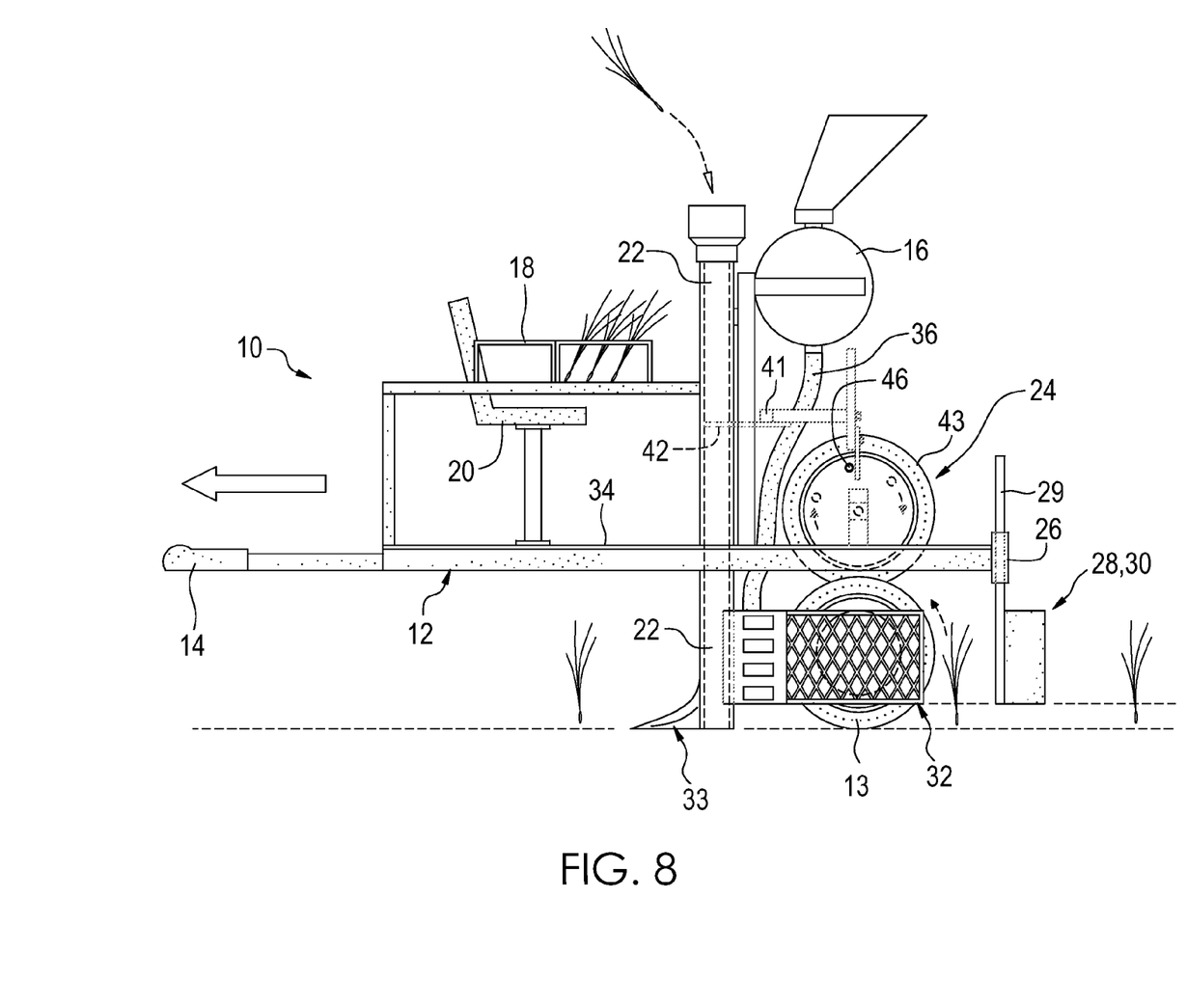
FIG. 8 is a side view of the second embodiment of the sea oats planter of FIG. 6.
Figure 9:
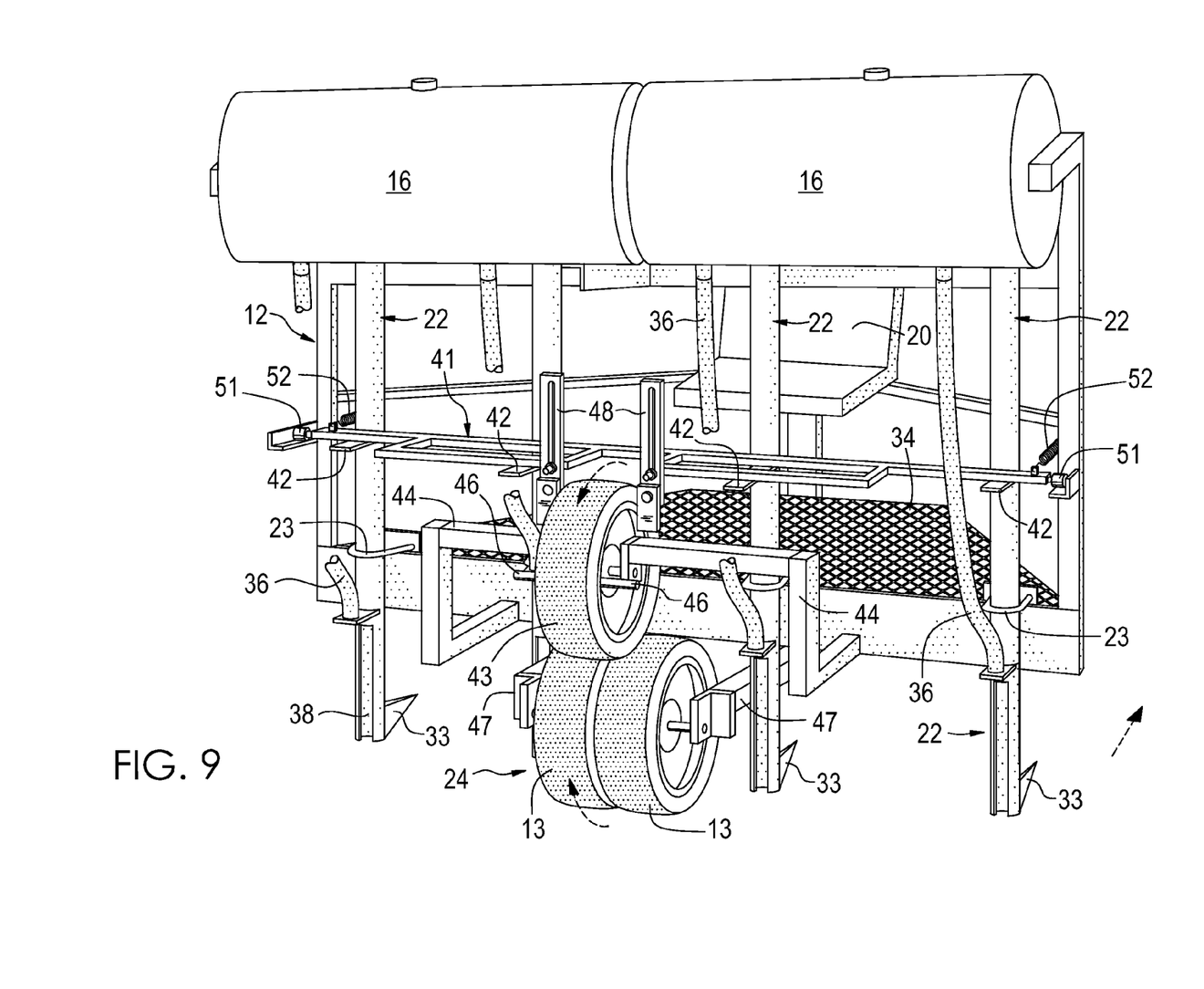
FIG. 9 is a perspective partial section, rear view of a part of the preferred embodiment of the sea oats planter of FIG. 6.

FIG. 6 shows an alternative embodiment of the sea oats planter 10. The main structural elements are the same, and all of the active elements of the planter shown in FIG. 1 are present in the embodiment of FIG. 6. However, one will note that the seat 20 has been repositioned closer to the hitch 14 and is a more comfortable padded, individual seat, and tray holders 18 have been repositioned to the right and left of the seat 20, but still within easy reach for loading. As in the preferred embodiment, a calibrator 24 measures the distance traveled by the planter to control the delivery of sea oats and growth agent, but the calibrator has been repositioned above, but in selective contact with the rear tires 13.

Figure 10:
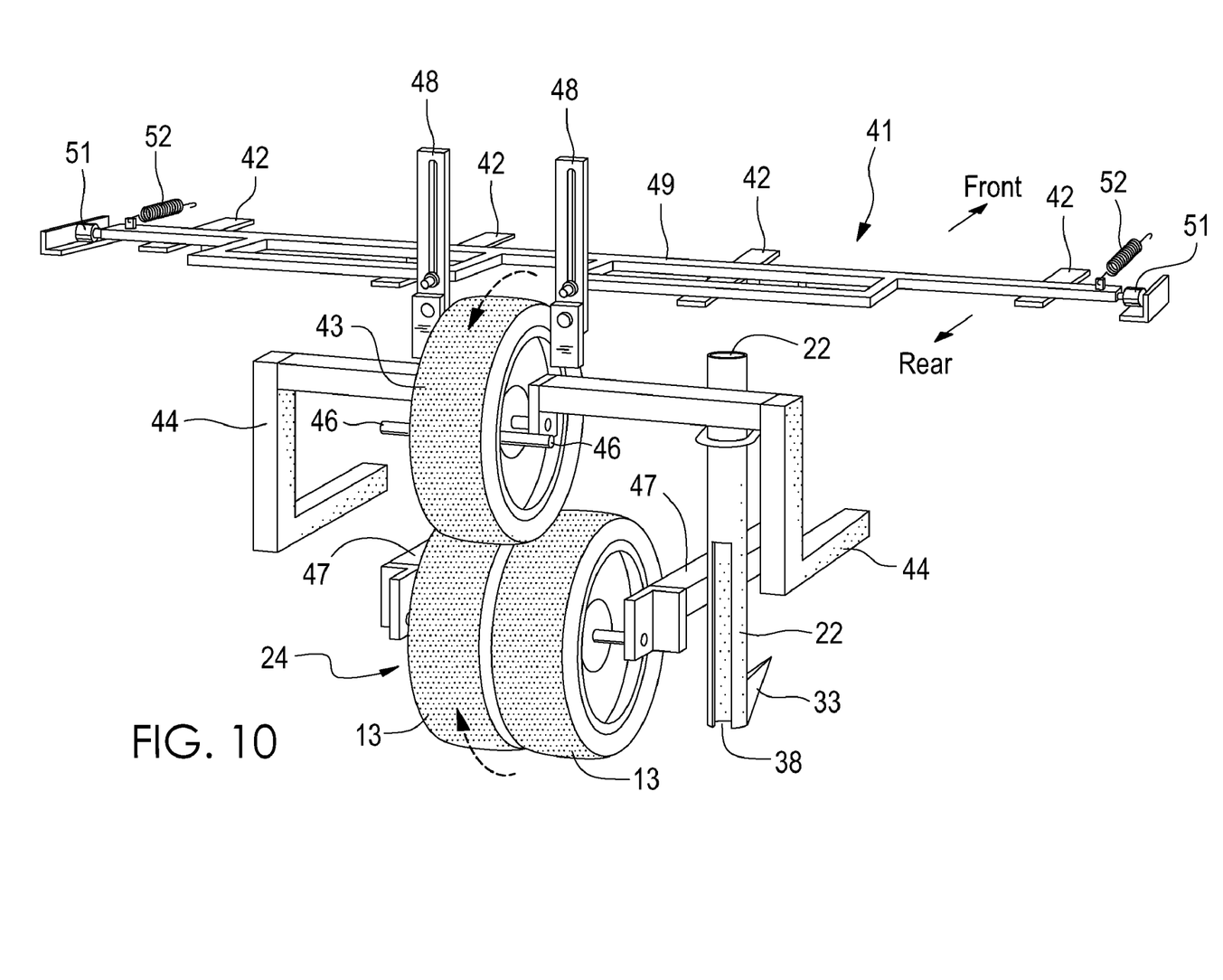
FIG. 10 is an isolated, perspective view of an alternative embodiment of the calibrator for the sea oats planter of FIG. 6.

In the second embodiment of FIG. 6, the distance calibrator 24 rests upon the lower pair of tires 13 rolling on the ground, which in turn rotate an upper tire 43 located above the lower pair of tires 13. The lower tires 13 rotate in the direction of movement, but bear upon and rotate the upper tire 43 in the opposite direction. As with the preferred embodiment in FIG. 1, an off-axis steel bar or peg 46 (See FIGS. 8-11) actuates the release bar 41. As shown in FIG. 10, the configuration includes lower and upper supports 44 and 47, with the lower pair of tires 13 being supported by the lower support 47 and the upper tire 43 is supported by the upper support 44. Both the lower and upper supports 47 and 44 are coupled to the frame 12 of the planter 10. The release bar 41 includes vertical posts 48, a horizontal rectangular frame member 49, tongues 42, a circular guide 51, and bias members 52.

The calibrator 24 works principally in the same manner as with the preferred embodiment of FIG. 1. As the pegs 46 rotate responsive to the counter rotating motion of tire 43 in contact with lower tires 13, each peg contacts and bears against the lower portion of vertical posts 48. The lower portion of the posts 48 is a resilient piece of rubber or like material that absorbs and translates the rotary motion of tire 43 into a rearward directed pulling force upon posts 48. As each post is pulled rearward, in tandem, release bar 41 is moved rearward to retract tongues 42 from within tubes 22, thereby releasing any sea oats loaded in tubes 22. As each peg 46 proceeds along the rotational path of wheel 43, contact with the lower resilient portion of post 48 is lost allowing springs 52 to pull the release bar 41 back into its recessed, standard position with each tongue inserted into and blocking each tube 22. The cycle repeats itself to the extent that peg 46 again encounters post 48.

Regarding the introduction of growth agent in this second embodiment, growth agent may be introduced in the same manner as previously described in the embodiment of FIG. 1, except that cable actuation may be initiated by the release bar 41 instead of the calibrator wheel 43. Also, growth agent hoses may simply be routed to each sea oats delivery tube 22 and metered out at constant and continuous amounts within the tube and accumulate at the tongue 42 of the release bar within each tube 22. As a plant slides down each tube 22, growth agent is picked up by the root ball of each plant and deposited along with each release of a plant. Alternatively, a combination of each of these methods may be utilized in which each grown agent hose 36 from its tank 16 simple ends in a valve adjacent to each cutout portion 38 of each tube 22. Each valve can be manually opened and a continuous stream of growth agent may be delivered within each furrow along with each plant as planting progresses.

In other embodiments, other distance calibrators may be used to determine distance traveled, and may actuate the release of the oats by other means. For example, electronic means may be used to measure distance and valves may be used for releasing the oats. Additionally, other mechanical means may be used to actuate and release the oats. The shown configurations are generally preferred due to their relative simplicity, but the embodiment in FIG. 1 is primarily preferred.

Figure 11:
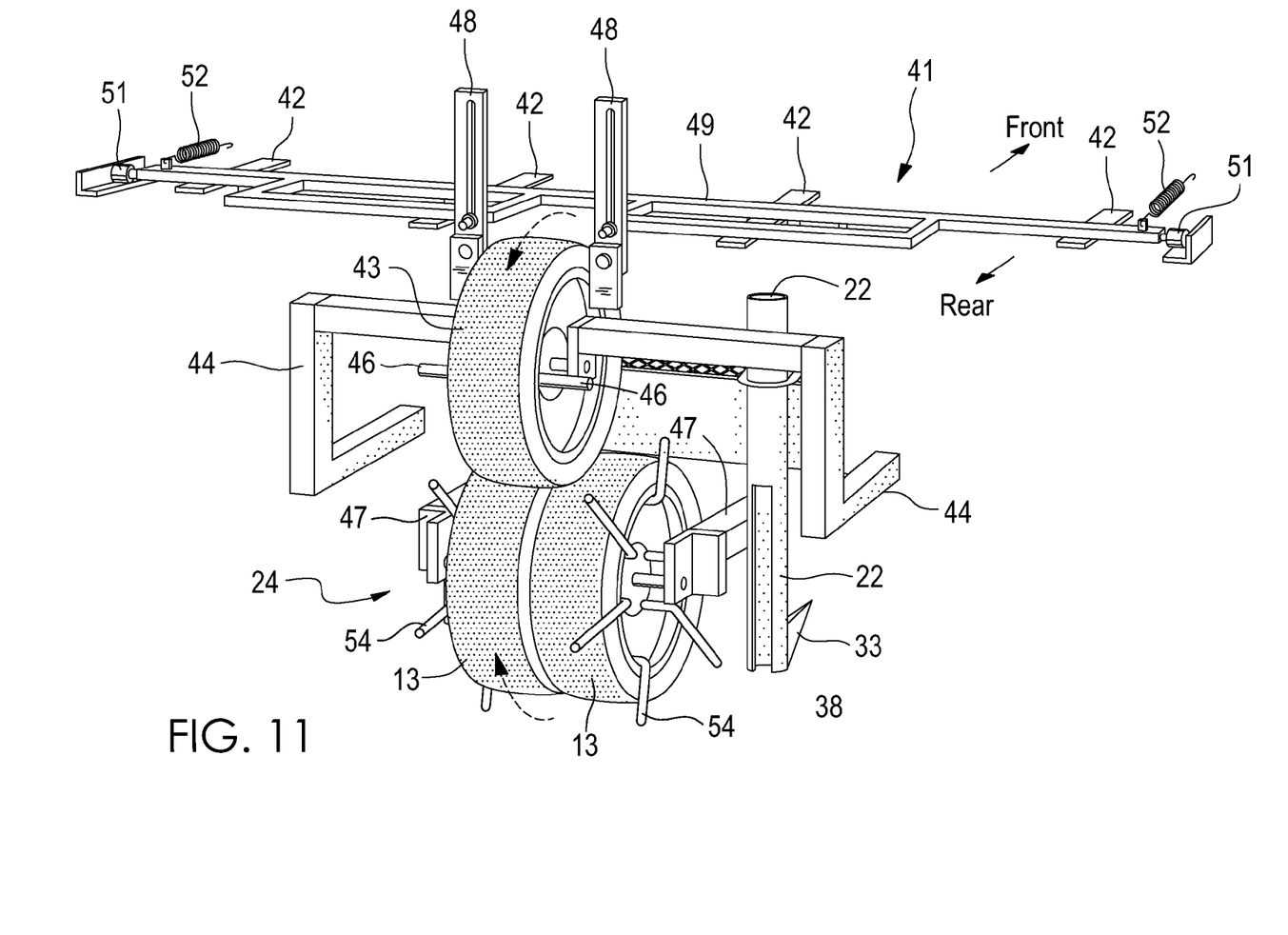
FIG. 11 is an isolated, perspective view of another version of the alternative embodiment calibrator for the sea oats planter of FIG. 6; and, FIG. 12 is forward looking perspective view along the planting furrow during planting.
Figure 12:
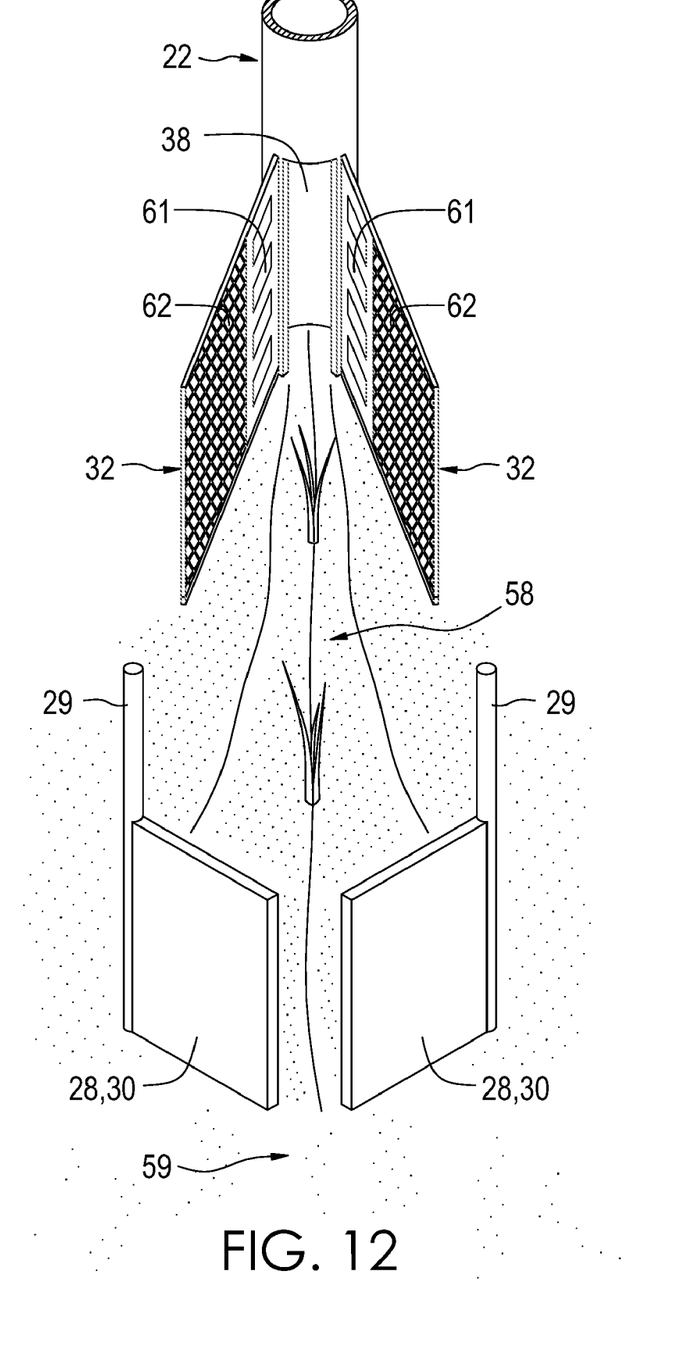

FIG. 12 shows a variation on the calibrator configuration shown in FIG. 11. The lower tires 13 now include a set of radially protruding tines. The tines 54 are positioned to dig into the ground, and help the tires 13 from slipping on the ground without rotating. Thus, for softer ground such as sand, the tines 54 allow the calibrator to continue to measure distance accurately. The remaining configuration and motion of the calibrator 24 is as discussed previously. The distance calibrator 24 rests on the ridge between formed furrows, and thus is vertically above the plows 33. The grates 32 and 28,30 are at a height between the plows 33 and the distance calibrator 24 to level the ground to a level between the depth of the furrows and the height of the ridge. This leveling occurs in the non-tined version as well.

Turning now to FIG. 12 showing interaction of the filling tube 22 with the soil, the applicable parts include the filling grate 32, leveling grates 28,30 and partial views of delivery tubes 22, and leveling grate posts 29. A forward portion of a furrow 58 and a rear portion of a furrow 59 show a relative change in grade and depth of the furrow along the grates 32 and 28,30. The filling grate 32 has two different types of holes to siphon the ground into the furrow. A slotted portion 61 has long slots cut into the grate 32, and expanded metal portion 62 extends behind the slotted portion. As ground initially tumbles into the furrow through the slotted portion 61, the seedling is set in the ground by falling into the forward portion 58 of the furrow. The remaining ground falls into the furrow in the rear portion of the furrow 59 through the expanded metal portion 62. The leveling grates 28,30 located rear of the filling grates 32, take any extra ground fill that is either built up from collapsing into the furrow too quickly or from not dropping into the furrow at all and remaining on the ridge, and flattens the furrow and ridge to an equal height without disturbing the planted sea oat.

As will be apparent to one skilled in the art, various modifications can be made within the scope of the aforesaid description. Such modifications being within the ability of one skilled in the art form a part of the present invention and are embraced by the claims below.

Having set forth the nature of the present invention, what is claimed is:

1. A sea oats planter, comprising:
   a. a frame configured to be moved across a planting area;
   b. a plurality of plows coupled to said frame configured to dig a furrow into said planting area;
   c. a release tube affixed to said frame and located behind each said plow for delivering a sea oats plant into said furrow, each said tube including a rearward facing open section at their lower ends thereof so that each sea oat plant may be released into said furrow without damaging the plant tops;
   d. at least one grate positioned adjacent to each said tube and adapted to siphon soil back into said furrow evacuated by said plow;
   e. a release bar intersecting each said tube for periodically releasing said sea oat plants down through said tubes and into said furrow; and,
   f. a calibrator mechanism for actuating said release bar at pre-selected intervals.

2. The planter of claim 1, wherein each said grate includes perforations adapted to siphon dry fluid soil back into each furrow in a controlled manner, and wherein said planter further comprises a rear horizontally arranged line of grates positioned to smooth soil around and into each said furrow.

3. The planter of claim 2, wherein said release bar comprises a horizontally positioned bar extending across said planter, a roller bearing at the ends of said horizontal bar for retractably supporting said release bar on said frame, a plurality of rigid tongues extending from said horizontal bar and into each said tube for inhibiting sea oats in said tube from dropping down said same, and at least one means for biasing each said tongue into said tube.

4. The planter of claim 3, wherein said release tubes are arranged horizontally across said planter and number at least four.

5. The planter of claim 4, wherein said calibrator comprises:
   a. a wheel positioned in rotatable contact with a towing tractor wheel, said wheel including an offset post on its rim thereof;
   b. a hydraulic cylinder positioned adjacent to said wheel; said hydraulic cylinder in fluidic communication with said release bar;
   c. an actuation rod for connecting said cylinder to said post in intermittent fashion, said rod including a resilient portion for contacting said post; and
   d. a support member for movably supporting said wheel adjacent to said tractor wheel.

6. The planter of claim 5, further comprising an operator seat positioned to face toward said release tubes and further including at least one loading rack for holding racks of sea oats plants in proximity to said release tubes to allow for easy operator insertion.

7. The planter of claim 6, wherein said planter includes a pair of rear wheels under said frame and positioned behind said release tubes to support said planter during movement across said planting area.

8. The planter of claim 7, wherein said rear support wheels further include tines around their circumference to enhance traction in loose soil.

9. The planter of claim 1, wherein said calibrator comprises:
   a. a wheel positioned in rotatable contact with a towing tractor wheel, said wheel including an offset post on its rim thereof;
   b. a hydraulic cylinder positioned adjacent to said wheel; said hydraulic cylinder in fluidic communication with said release bar;
   c. an actuation rod for connecting said cylinder to said post in intermittent fashion, said rod including a resilient portion for contacting said post; and
   d. a support member for movably supporting said wheel adjacent to said tractor wheel.

10. The planter of claim 1, wherein said release bar comprises a horizontally positioned bar extending across said planter, a roller bearing at the ends of said horizontal bar for retractably supporting said release bar on said frame, a plurality of rigid tongues extending from said horizontal bar and into each said tube for inhibiting sea oats in said tube from dropping down said same, and at least one means for biasing each said tongue in said tube.

11. The planter of claim 1, further comprising:
   a. at least one tank held by said frame for holding plant growth agent;
   b. a tube running from said at least one tank to the bottom of each release tube;
   c. means adjacent to said bottom of each release tube for releasing said growth agent into said furrow; and,
   d. means responsive to said calibrator for actuating said growth agent release means.

12. A sea oats planter, comprising:
   a. a frame configured to be moved across a planting area;
   b. a plurality of means coupled to said frame for digging a furrow into said planting area;
   c. a release tube affixed to said frame and located behind each said furrow means for delivering a sea oats plant into said furrow, each said tube including a rearward facing open section at their lower ends thereof so that each sea oat plant may be released into said furrow without damaging the plant tops;
   d. means positioned adjacent to each said tube for siphoning soil back into said furrow evacuated by said furrow means;
   e. release means for periodically releasing said sea oat plants down through said tubes and into said furrow; and,
   f. calibrator means for actuating said release bar at preselected intervals.

13. The planter of claim 12, wherein each said siphoning means includes perforations adapted to variably siphon fluid soil back into each furrow in a controlled manner, and wherein said planter further comprises rear leveling means for smoothing soil around and into each said furrow.

14. The planter of claim 13, wherein said release means comprises a horizontally positioned bar extending across said planter, a roller bearing at the ends of said horizontal bar for retractably supporting said horizontal bar on said frame, a plurality of rigid tongues extending from said horizontal bar and into each said tube for inhibiting sea oats in said tube from dropping down said same, and a biasing means for forcing each said tongue into said tube.

15. The planter of claim 14, wherein said release tubes are arranged horizontally across said planter and number at least four.

16. The planter of claim 15, wherein said planter includes wheels under said frame and positioned behind said release tubes to support said planter during movement across said planting area.

17. The planter of claim 16, wherein said calibrator means comprises:
   a. a wheel positioned in rotatable contact with said rear wheels, said calibrator wheel including at least one offset post on its rim thereof;
   b. an actuation bracket having one end rigidly connected to said release means and having its other end positioned adjacent to said calibrator wheel such that said bracket contacts said post in intermittent fashion as said wheel rotates, said bracket including a resilient portion for reliantly contacting said post; and,
   c. a support member affixed to said frame for supporting said calibrator wheel adjacent to said rear wheels.

18. The planter of claim 17, further comprising an operator seat positioned to face toward said release tubes and further including at least one loading rack for holding racks of sea oats plants in proximity to said release tubes to allow for easy operator insertion.

19. The planter of claim 18, wherein said pair of rear support wheels further include tines around their circumference to facilitate traction in loose soil.

20. The planter of claim 12, wherein said calibrator means comprises:
   a. a wheel positioned in rotatable contact with said rear wheels, said calibrator wheel including at least one offset post on its rim thereof;
   b. an actuation bracket having one end rigidly connected to said release means and having its other end positioned adjacent to said calibrator wheel such that said bracket contacts said post in intermittent fashion as said wheel rotates, said bracket including a resilient portion for reliantly contacting said post; and,
   c. a support member affixed to said frame for supporting said calibrator wheel adjacent to said rear wheels.

21. The planter of claim 12, wherein said release means comprises a horizontally positioned bar extending across said planter, a roller bearing at the ends of said horizontal bar for retractably supporting said horizontal bar on said frame, a plurality of rigid tongues extending from said horizontal bar and into each said tube for inhibiting sea oats in said tube from dropping down said same, and a biasing means for forcing each said tongue into said tube.

22. The planter of claim 12, further comprising:
   a. at least one tank held by said frame for holding plant growth agent;
   b. a tube running from said at least one tank to the bottom of each release tube;
   c. means adjacent to said bottom of each release tube for releasing said growth agent into said furrow; and,
   d. means responsive to said calibrator means for actuating said growth agent release means.

23. A method for planting sea oats in sand, comprising the steps of:
   a. using a plow on a mechanized planter to make a furrow in the direction of travel of a mechanized planter;

b. loading a sea oat into a vertical release tube positioned on said planter and above said furrow;
c. calculating the distance of travel of said plow;
d. releasing said sea oat into said furrow in response to a calibrating mechanism actuating a release bar intersecting said release tube after a pre-determined distance;
e. siphoning sand back into said furrow and around said sea oat through a grate; and,
f. leveling sand adjacent to said furrow after said siphoning step.

* * * * *